United States Patent Office 2,854,340
Patented Sept. 30, 1958

2,854,340
STABILIZERS FOR FROZEN DESSERTS

Rudolf Köhler, Dusseldorf, and Wolfgang Dierichs, Dusseldorf-Holthausen, Germany, assignors to Henkel & Cie, G. m. b. H., Dusseldorf-Holthausen, Germany, a corporation of Germany No Drawing. Application December 13, 1955
Serial No. 552,700

Claims priority, application Germany December 15, 1954

14 Claims. (Cl. 99—136)

This invention relates to the preparation of frozen desserts and more particularly to the preparation of ice cream, sherbet, ices, and the like, using alginic acid amides as stabilizers.

It has long been common practice to employ small percentages of stabilizers and emulsifiers in ice cream and other frozen desserts. Stabilizers function in ice cream through their ability to form gel structures in water solutions or to combine with water as water of hydration. Stabilizers absorb water, prevent the formation of coarse ice crystals and impart smoothness and mouth-filling properties to the finished frozen dessert. Examples of specific compounds which are commonly used as stabilizers for frozen desserts are gelatines, agar-agar, tragacanth, water-soluble cellulose ethers, and similar water-soluble colloidal substances.

While these known stabilizers produce highly palatable and commercially desirable frozen dessert products, their use is in most cases accompanied by certain disadvantages. For example, if gelatines are used as stabilizers, the frozen dessert mix must be aged anywhere from a few hours to one entire day after being homogenized and just prior to freezing, the length of aging time depending upon the composition of the mix and other variable factors. If sodium alginate is used as the stabilizer, the homogenized frozen dessert mix does not need to age for extended periods of time, but certain measures must be taken to prevent the formation of insoluble salts from the calcium in the milk base and the alginate. Thus, for example, water-soluble alginates can only be used as stabilizers in the production of frozen dessert products if equivalent amounts of ortho-phosphate, meta-phosphate or other substances are also added to the mix which precipitate the calcium in the form of an insoluble compound or retain the calcium in solution the form of a complex. Moreover, alginates are rather unstable in the presence of acidic fruit extracts, so that their use as stabilizers in frozen dessert products is limited to those which contain flavorings other than acidic fruit extracts.

It is an object of the present invention to overcome the above disadvantages and to provide stabilizers for frozen desserts which do not require the application of time-consuming and other costly measures to produce a homogeneous, full-bodied and smooth frozen dessert product.

Another object of the present invention is to provide stabilizers for frozen desserts which do not require the simultaneous use of phosphates or other substances to prevent the precipitation of calcium from the frozen dessert mix.

Still another object of the present invention is to provide stabilizers for frozen desserts which are stable in the presence of acidic fruit extracts contained in fruit-flavored frozen dessert mixes.

Still further objects of our invention will become apparent as the description thereof proceeds.

We have discovered that water-soluble alginic acid amides are excellent stabilizers for use in the preparation of frozen desserts, particularly in the preparation of ice cream, sherbet, ices, and the like. More particularly stated, the water-soluble alginic acid amides used as stabilizers in accordance with the present invention are those in which at least 40%, preferably from 60 to 100%, of the carboxyl groups present in the alginic acid molecule have been converted into carboxy amide groups. The carboxyl groups referred to include free carboxyl groups as well as neutralized carboxyl groups and their derivatives. Such alginic acid amides are readily obtained by a reaction between alginic acid esters and liquid ammonia or amines. Various methods of producing these alginic acid amides are described in copending application Serial No. 496,920, filed March 25, 1955.

The concentration of alginic acid amide in the frozen dessert mix should be at least 0.1% by weight, preferably from 0.2 to 1% based upon the amount of water present in the mix. In some instances, however, larger amounts of the alginic acid amide stabilizer may be used; for example, the amount may exceed 2% by weight and may be as high as 5% by weight based upon the amount of water present in the frozen dessert mix.

In the above co-pending application it is pointed out that amides of alginic acid having a sufficiently high degree of amidation are capable of forming gels in dilute aqueous solutions. However, the concentration necessary to form such gels varies with the degree of amidation. Since it is generally not desirable to permit the formation of gels in the homogenized but yet unfrozen dessert mix at temperatures between 0 and 25° C., it is preferred to add the alginic acid amide stabilizer to the mix in amounts below the critical concentration at which gels will be formed. If it is desired to use greater amounts of alginic acid amide, for example from about 1 to 5% by weight, it is advantageous to use alginic acid amides having a degree of amidation below 80%.

The addition of the alginic acid amide stabilizer in accordance with the present invention may occur at any desired point in the preparation of the dessert mix to be frozen. It is therefore advantageous to accelerate the dissolution of the alginic acid amide in the mix or in the liquid base by heating the mix or the liquid base to temperatures from 50 to 100° C.

In general, the alginic acid amide stabilizers may be used in conjunction with all types of frozen dessert mixes regardless of the particular individual ingredients which compose the frozen dessert mix.

The principal advantages of the alginic acid amide stabilizer over the stabilizers heretofore used for frozen desserts are that the finished dessert is marked by extraordinary smoothness and full body, and that the necessity for the addition of phosphates is completely eliminated. In addition, the alginic acid amide stabilizers, in contrast to alginates and the like, are fully stable in the presence of acidic fruit extracts, so that they may readily be used in frozen dessert mixes flavored with all types of fruit extracts.

The following examples will further illustrate our invention and enable other persons skilled in the art to understand the invention more completely. It is understood, however, that we do not wish to limit ourselves to the particular ingredients and conditions recited in these examples.

Example 1

The alginic acid amide used for the preparation of this ice cream mix was one in which about 70% of the carboxyl groups present in the alginic acid radical had been transformed into carboxy amide groups; the remainder of the carboxyl groups were present primarily in the form of carboxy ammonium groups. This alginic acid amide was produced from an alginic acid glycol ester in which 75% of the carboxyl groups present in the alginic acid radical were esterified with glycol in accordance with the following procedure.

40 gm. of the moist alginic acid glycol ester, which contained about 90% solids and which had previously been fully washed with alcohol, were placed into an autoclave together with 100 gm. liquid anhydrous ammonia at a temperature between 18 and 25° C.; this mixture was allowed to stand at the stated temperature for about 24 hours, during which time the pressure in the autoclave rose to about 9 atmospheres. At the end of 24 hours the ammonia was removed by evaporation and the product in the autoclave was washed with an 80% solution of ethyl alcohol and finally dried at 40° C.

500 parts by weight whole milk, 75 parts by weight powdered whole milk and 20 parts by weight of cocoa powder were admixed with each other and the mixture was thoroughly stirred and homogenized. Thereafter, a mixture of 60 parts by weight sugar and 1.5 parts by weight of the alginic acid amide produced in accordance with the above process was slowly added to the cocoa-flavored homogenized milk mixture, accompanied by vigorous stirring. This combined ice cream mix was then heated to about 70 to 75° C. and allowed to stand for 15 to 20 minutes at the same temperature while occasionally stirring the mix. Subsequently the warm mix was placed into a suitable homogenizer and was very thoroughly and intensively homogenized. Thereafter the homogenized mass was cooled to 0° C. and, without aging, was intensively whipped at a temperature between 0 and −2° C., whereby the volume of the mass increased by 50 to 100%. This cold whipped ice cream mix was then poured into molds and frozen at temperatures from −1 to −28° C. The finished frozen ice cream was extremely smooth, full-bodied and mouth-filling and the ice crystals contained therein were substantially smaller than in ice cream prepared from ice cream mixes comprising equivalent amounts of stabilizers heretofore commonly used.

Similar results were obtained when the homogenized mix was cooled to 0° C., then poured into molds without whipping and finally frozen at the above temperatures while stirring.

*Example 2*

150 parts by weight of cream, 120 parts by weight of whole milk and 100 parts by weight of skimmed milk were mixed. To this mixture there were added 40 parts by weight of skimmed milk powder, 1.2 parts by weight of the alginic acid amide used in the Example 1 and 54 parts by weight of sugar. The alginic acid amide may be mixed in a dry state with four times its own weight of the sugar before adding to the fluid mixture.

The mix was heated to about 75° C., homogenized by mechanical means and cooled down to between +1 and +2° C. Then, 10–15 parts by weight of strawberries were added and enough citric acid to bring the pH of the mix to 2–3. The mix was frozen under agitation at temperatures of −30 to −35° C. The ice cream had an extraordinary smoothness and full body.

*Example 3*

50 parts by weight of sugar were dissolved in 200 parts by weight of water. 6.5 parts by weight alginic acid amide, used in Example 1, were added. The solution was heated to 75° C. and held at this temperature under stirring until the amide was dissolved. The solution was then cooled down to between +1 and +2° C. and lemon juice was added in such an amount that the pH of the solution was about 3. The solution remained homogeneous. It was frozen at −16° C. during 15 minutes. A homogeneous lemon ice cream of very good flavor was obtained.

While we have disclosed specific embodiments of our invention, it will be obvious to persons skilled in the art that various changes and modifications may be made without departing from the spirit of the invention or the scope of the appended claims.

We claim:

1. In a process of producing frozen desserts, the steps of adding to the unfrozen milk-base dessert ingredients about 0.1 to 5 by weight, based on the amount of water present in the ingredients, of an alginic acid amide wherein at least 40% of the alginic acid carboxyl groups have been transformed into amide groups, dispersing said amide homogeneously throughout said ingredients and freezing the homogenized mixture.

2. In a process of producing ice cream, the steps of adding to the unfrozen milk-base liquid ice cream ingredients about 0.1 to 5% by weight, based on the amount of water present in the ingredients, of an alginic acid amide wherein from 60 to 100% of the alginic acid carboxyl groups have been transformed into amide groups, dispersing said amide homogeneously throughout said ingredients and freezing the homogenized mixture.

3. In a process of producing chocolate ice cream, the steps of forming a substantially liquid mixture of whole milk, whole milk powder and coca powder, adding to said mixture from 0.2 to 1% by weight, based upon the water content of said mixture, of an alginic acid amide wherein about 70% of the alginic acid carboxyl groups have been converted into amide groups, dispersing said amide homogeneously in said mixture to form an ice cream mix, and freezing said mix into ice cream.

4. A frozen dessert comprising a milk base, flavoring and, as a stabilizer, 0.1 to 5% by weight of an alginic acid amide, based upon the water content of the milk base, at least 40% of the alginic acid carboxyl groups in said amide having been converted into amide groups.

5. Ice cream comprising a milk base, flavoring and, as a stabilizer, 0.1 to 5% by weight, based upon the water content of the milk base, of an alginic acid amide wherein from 60 to 100% of the alginic acid carboxyl groups have been converted into amide groups.

6. Ice cream comprising whole milk, whole milk powder, cocoa flavoring and, as a stabilizer, 0.2 to 1% by weight, based upon the water content of the whole milk, of an alginic acid amide wherein about 70% of the alginic acid carboxyl groups have been converted into amide groups.

7. In a process of producing frozen desserts, the steps of adding to the unfrozen aqueous base dessert ingredients about 0.1 to 5% by weight, based on the amount of water present in the ingredients, of an alginic acid amide wherein at least 40% of the alginic acid carboxyl groups have been transformed into amide groups, dispersing said amide homogeneously throughout said ingredients and freezing the homogenized mixture.

8. In a process of producing ice cream, the steps of adding to the unfrozen liquid ice cream ingredients about 0.1 to 5% by weight, based on the amount of water present in the ingredients, of an alginic acid amide wherein from 60 to 100% of the alginic acid carboxyl groups have been transformed into amide groups, dispersing said amide homogeneously throughout said ingredients and freezing the homogenized mixture.

9. A frozen dessert comprising an aqueous base, flavoring and, as a stabilizer, 0.1 to 5% by weight of an alginic acid amide, based upon the water content of the dessert, at least 40% of the alginic acid carboxyl groups in said amide having been converted into amide groups.

10. Ice cream comprising an aqueous base, flavoring and, as a stabilizer, 0.1 to 5% by weight, based upon the water content of the aqueous base, of an alginic acid amide wherein from 60 to 100% of the alginic acid carboxyl groups have been converted into amide groups.

11. In a process of producing frozen desserts, the steps of adding to the unfrozen aqueous base dessert ingredients, containing natural fruit liquor, about 0.1 to 5% by weight, based on the amount of water present in the ingredients, of an alginic acid amide wherein at least 40% of the alginic acid carboxyl groups have been transformed into amide groups, dispersing said amide homogeneously throughout said ingredients and freezing the homogenized mixture.

12. In a process of producing frozen desserts, the steps of adding to the unfrozen aqueous base dessert ingredients, containing natural acid reacting fruit liquor, about 0.1 to 5% by weight, based on the amount of water present in the ingredients of an alginic acid amide wherein at least 40% of the alginic acid carboxyl groups have been transformed into amide groups, dispersing said amide homogeneously throughout said ingredients and freezing the homogenized mixture.

13. A frozen dessert comprising an aqueous base, flavoring, a natural fruit liquor and, as a stabilizer, 0.1 to 5% by weight of an alginic acid amide, based upon the water content of the dessert, at least 40% of the alginic acid carboxyl groups in said amide having been converted into amide groups.

14. A frozen dessert comprising an aqueous base, flavoring, a natural acid reacting fruit liquor and, as a stabilizer, 0.1 to 5% by weight of an alginic acid amide, based upon the water content of the dessert, at least 40% of the alginic acid carboxyl groups in said amide having been converted into amide groups.

References Cited in the file of this patent

UNITED STATES PATENTS

| | | |
|---|---|---|
| 2,485,934 | Steiner | Oct. 25, 1949 |
| 2,494,912 | Steiner | Jan. 17, 1950 |
| 2,653,106 | Bonnkisen | Sept. 22, 1953 |

FOREIGN PATENTS

| | | |
|---|---|---|
| 602,609 | Great Britain | Mar. 17, 1939 |